US012060168B2

(12) United States Patent
Orlic et al.

(10) Patent No.: US 12,060,168 B2
(45) Date of Patent: Aug. 13, 2024

(54) DEVICE FOR CONTROLLING THE GROUND CLEARANCE OF AN AIRSHIP AND DOCKING STATION FOR AN AIRSHIP INTEGRATING SUCH A DEVICE

(71) Applicant: Flying Whales, Suresnes (FR)

(72) Inventors: Yovan Orlic, Suresnes (FR); Théo Dulou, Suresnes (FR)

(*) Notice: Subject to any disclaimer, the term of this patent is extended or adjusted under 35 U.S.C. 154(b) by 81 days.

(21) Appl. No.: 17/759,778

(22) PCT Filed: Jan. 29, 2021

(86) PCT No.: PCT/FR2021/050175
§ 371 (c)(1),
(2) Date: Jul. 29, 2022

(87) PCT Pub. No.: WO2021/152275
PCT Pub. Date: Aug. 5, 2021

(65) Prior Publication Data
US 2023/0076684 A1 Mar. 9, 2023

(30) Foreign Application Priority Data
Jan. 31, 2020 (FR) ....................... 2001000

(51) Int. Cl.
*B64F 1/14* (2006.01)
*B64B 1/66* (2006.01)

(52) U.S. Cl.
CPC . *B64F 1/14* (2013.01); *B64B 1/66* (2013.01)

(58) Field of Classification Search
CPC .................... B64F 1/14; B64B 1/66
See application file for complete search history.

(56) References Cited

U.S. PATENT DOCUMENTS 1,373,343 A * 3/1921 Masterman ............... B64F 1/14
244/115
1,686,806 A * 10/1928 Fox .......................... B64F 1/14
244/115
(Continued)

FOREIGN PATENT DOCUMENTS

DE      102016007123    9/2017
FR        2706151 A1    12/1994
(Continued)

OTHER PUBLICATIONS

International Search Report for International Application No. PCT/FR2021/050175 dated Apr. 27, 2021, 3 pages.
(Continued)

*Primary Examiner* — Jessica B Wong
(74) *Attorney, Agent, or Firm* — TraskBritt

(57) ABSTRACT

A device for controlling the ground clearance of an airship, the airship being provided with two lateral anchoring points, comprises: a frame on which a weight is fixed; two (rigid) arms each having a proximal end that is articulated on the frame, and a distal end; means for moving the distal end of each arm between a retention position in which each distal end is in contact with a lateral anchoring end of the airship that is configured to be connected to the distal end, and an unlocked position in which there is no contact between the airship and the docking station; and means for detachably fixing, in the retention position, the respective distal end of each arm on the associated respective lateral anchoring point.

11 Claims, 1 Drawing Sheet

(56) References Cited

U.S. PATENT DOCUMENTS

| | | | | |
|---|---|---|---|---|
| 1,693,476 A * | 11/1928 | Corbett | ............... | B64F 1/14 244/116 |
| 1,720,928 A * | 7/1929 | Stahl | ............... | B64F 1/14 280/47.131 |
| 1,749,065 A * | 3/1930 | Burney | ............... | B64F 1/14 244/116 |
| 3,905,567 A * | 9/1975 | Menke | ............... | B64F 1/14 244/115 |
| 4,421,286 A * | 12/1983 | Laky | ............... | B64F 1/14 244/116 |
| 4,762,295 A * | 8/1988 | Yon, Jr. | ............... | B64F 1/14 244/30 |
| 5,143,323 A * | 9/1992 | Husain | ............... | B64F 1/14 244/116 |
| 8,070,096 B2 * | 12/2011 | Wood | ............... | B64F 1/14 244/116 |
| 10,981,663 B2 * | 4/2021 | Stretton | ............... | B64D 27/12 |
| 2006/0197308 A1 * | 9/2006 | Shmueli | ............... | B64B 1/66 280/400 |
| 2013/0068879 A1 * | 3/2013 | Colting | ............... | B64B 1/58 244/93 |
| 2014/0284423 A1 * | 9/2014 | Utsch | ............... | B64F 1/02 244/110 E |
| 2022/0081097 A1 * | 3/2022 | White | ............... | B64B 1/30 |
| 2023/0076684 A1 * | 3/2023 | Orlic | ............... | B64B 1/66 |

FOREIGN PATENT DOCUMENTS

| | | |
|---|---|---|
| FR | 2793467 B1 | 6/2001 |
| WO | 2009/134928 A1 | 11/2009 |
| WO | 2018/099870 A1 | 6/2018 |

OTHER PUBLICATIONS

International Written Opinion for International Application No. PCT/FR2021/050175 dated Apr. 27, 2021, 8 pages.

* cited by examiner

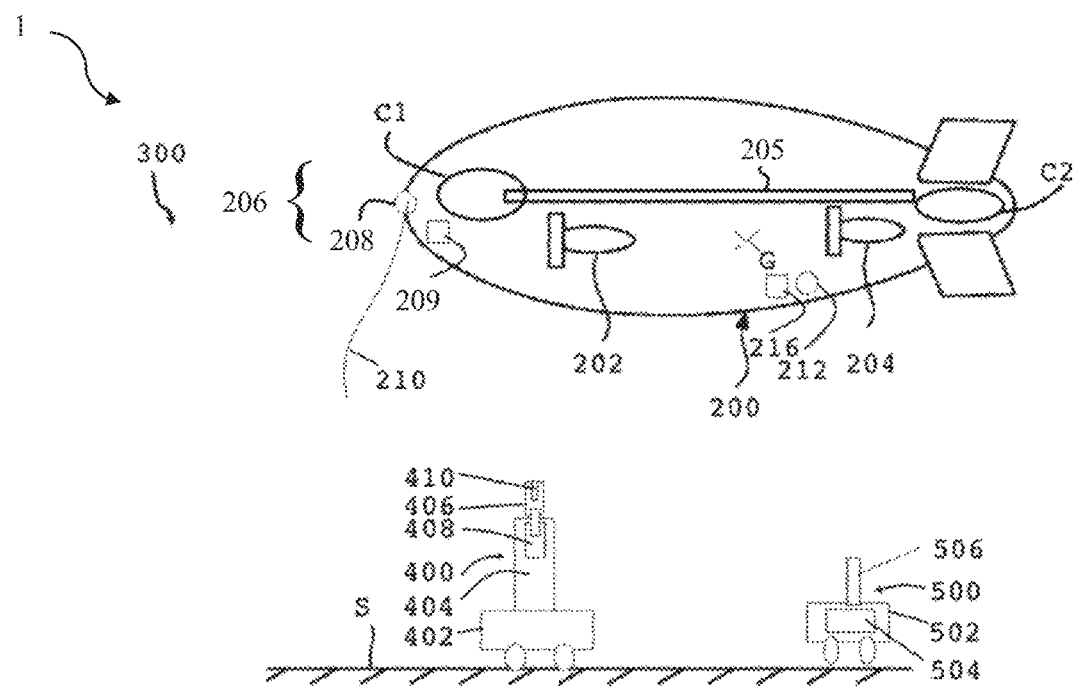
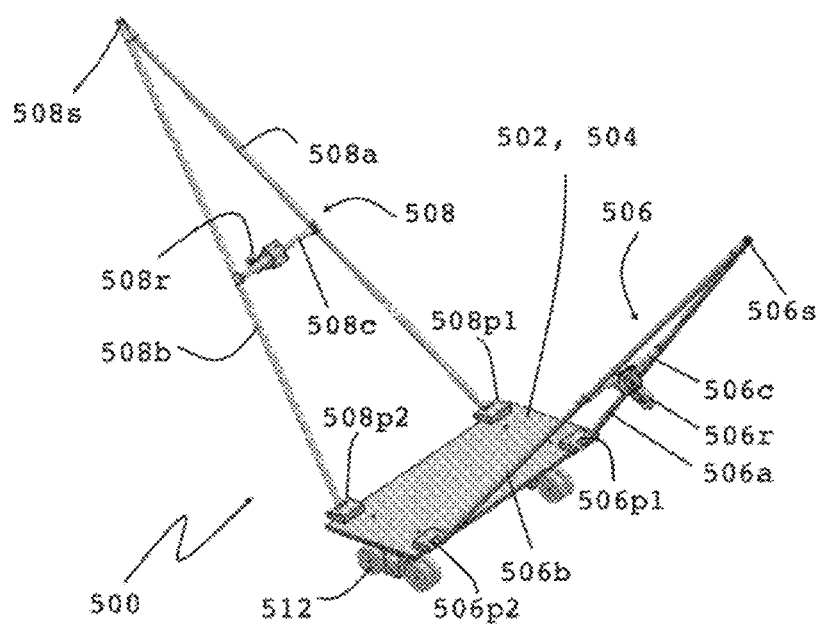
FIG. 1
FIG. 2

DEVICE FOR CONTROLLING THE GROUND CLEARANCE OF AN AIRSHIP AND DOCKING STATION FOR AN AIRSHIP INTEGRATING SUCH A DEVICE

CROSS-REFERENCE TO RELATED APPLICATIONS

This application is a national phase entry under 35 U.S.C. § 371 of International Patent Application PCT/FR2021/050175, filed Jan. 29, 2021, designating the United States of America and published as International Patent Publication WO 2021/152275 A1 on Aug. 5, 2021, which claims the benefit under Article 8 of the Patent Cooperation Treaty to French Patent Application Serial No. FR2001000, filed Jan. 31, 2020.

TECHNICAL FIELD

The present disclosure relates to a device for controlling the ground clearance of an airship.

The present disclosure relates to a docking station for an airship, in particular, for an airship with a rigid structure. It also relates to a method for secure mooring of an airship, implementing this docking station, as well as an airship adapted for this secure mooring.

BACKGROUND

Several solutions have been devised to guarantee the ground clearance of an airship moored by its nose cone and to prevent it from touching the ground, such as that of a wheel placed under the rear nacelle of the USS Los Angeles or a weighted wheel fixed by cables on the back of Goodyear blimps. However, while preventing the airship from either ascending or descending, these systems do not prevent the airship from departing in the opposite direction.

French Patent No. FR 2 706 151 is also known, which discloses a landing and mooring device fitted to an airship. The device is not suitable for airships having no landing gear. Furthermore, the device does not prevent the airship from adopting a pitch-up attitude or from touching the ground with its empennage.

U.S. Pat. No. 1,749,065 discloses a system for docking an airship, comprising a mooring mast for the nose of the airship and several carriages guided on rails, each carriage comprising a pair of arms movable between a horizontal position and a substantially vertical position in which the ends of these movable arms can mechanically engage with the airship. The carriages have bogies with wheels guided by longitudinal or circular rails. The present disclosure relates to a landing gear for rigid airships and aims to provide ground clearance for a rigid airship moored from the front to a low or truncated mast. When moored to a low mast, the airship must be able to turn around the mast without hitting the ground or slinging. The present disclosure has the additional object of supporting the rear of the rigid airship and allowing it to rotate about the mooring mast without damaging the structure of the airship while also limiting the angle of roll.

BRIEF SUMMARY

One aim of the present disclosure is to address, in particular, all or part of the aforementioned drawbacks.

According to a first aspect of the present disclosure, proposed is a device for controlling the ground clearance of an airship provided with two lateral anchoring points, the control device comprising:
- a frame comprising a ground connection interface, on which a weight is fixed,
- two rigid arms, each of the arms having a so-called proximal end articulated on the frame and a so-called distal end,
- a means for moving the distal end of each arm between a position, called retention position, in which each distal end is in contact with one of the lateral anchoring ends of the airship, said to be associated with the distal end, and a position, called unlocked position, in which there is no contact between the airship and the device,
- means for detachably fixing, in the retention position, the respective distal end of each arm on the associated respective lateral anchoring point,
- wherein the ground connection interface comprises wheels mounted on the frame and whose orientation can be modified.

The wheels mounted on the frame can be idler wheels or wheels whose orientation is controllable.

The means for bringing a distal end closer to an arm of the associated lateral anchor may comprise a winch placed in the airship at the associated lateral anchor and a rope wound on the winch and passing through the associated lateral anchor and the distal end.

Each of the arms may have an A-shaped configuration formed by two main beams forming the lateral branches of the A, connected together at a vertex and connected together by a third beam forming the horizontal branch of the A, two proximal ends of an arm being arranged at the bottom of the two lateral branches of the A and articulated on the frame, the distal end of the arm being arranged at the vertex of the A, thus defining an axis of rotation of the arm on the frame in the direction formed from both proximal ends.

The third beams of each of the arms can be fitted with wheels.

According to another aspect of the present disclosure, proposed is a docking station for an airship equipped with a tapered anchoring point and two lateral anchoring points comprising:
- a mooring mast provided with a receiver arranged to receive, or be moored at, the tapered anchor of the airship,
- a clearance control device according to one of the preceding claims, the distal end of each of the arms of which is arranged to be removably fixed to each of the two lateral anchoring points.

The device according to the present disclosure may comprise a ground connection interface arranged to describe an arc of a circle around the mooring mast when the tapered anchor of the airship is received in the receiver of the mooring mast and when each of the distal ends is attached to the lateral anchoring points of the airship.

According to yet another aspect of the present disclosure, proposed is a method for securing the mooring of an airship equipped with a tapered anchoring point and two lateral anchoring points, on a site, implementing a docking station according to the present disclosure, comprising the following steps:
- mooring the bow of the airship to the mast of the station with freedom of rotation of the airship about the mast,
- motorized displacement of the clearance control device according to the present disclosure to position itself under the tail of the airship already moored, deploying both arms until reaching the lateral anchoring points, and fixing the distal ends of the two arms to the respective anchoring points.

The method according to the present disclosure may further comprise, prior to the step of deploying the arms, a step for unwinding a cable from each lateral anchoring point, one free end of which is provided to be fixed to a distal end of each arm, and in that the deploying step comprises a step for winding up the cables until the respective distal ends of two arms mechanically engage in the respective lateral anchoring points.

The method according to the present disclosure can further comprise a step for tilting the airship so that the tail of the airship rests on the clearance control device according to the present disclosure. When the method according to the present disclosure is implemented in an airship provided with a ballast system comprising a first ballast tank located at the front of the airship and a second ballast tank located at the rear of the airship, the tilting step comprises a step for transferring water from the first forward ballast tank to the second aft ballast tank.

According to yet another aspect of the present disclosure, proposed is an airship comprising a body provided with a nose and a provided with two lateral anchoring points arranged on either side of the body of the airship, adapted to be moored at the bow to a mooring mast and at the stern to a docking station according to the present disclosure, characterized in that it further comprises motorized means for rolling up/unrolling two cables, one respective proximal end of which is connected to the motorized means.

BRIEF DESCRIPTION OF THE DRAWINGS

Other advantages and particularities of the present disclosure will become apparent on reading the detailed description of implementations and embodiments, which are in no way limiting, with reference to the accompanying drawings, in which:

FIG. 1 illustrates a first embodiment of a docking station for an airship according to the present disclosure, and FIG. 2 illustrates an airship ground clearance control device in a docking station of FIG. 1.

DETAILED DESCRIPTION

Since the embodiments described hereinafter are not limiting in nature, it is possible, in particular, to consider variants of the embodiments of the present disclosure that comprise only a selection of the features that are described, provided that this selection of features is sufficient to confer a technical advantage or to differentiate the present disclosure from the prior art. This selection comprises at least one preferably functional feature without structural details, or with only a portion of the structural details if this portion alone is sufficient to confer a technical advantage or to differentiate the embodiments of the present disclosure from the prior art.

In the figures, an element appearing in a plurality of figures retains the same reference.

Referring to FIG. 1, there is described a system 1, according to an embodiment according to the present disclosure, for mooring an airship 200 to a docking station 300 according to an embodiment of the present disclosure, and a ground or a track S, at the same time as the method implemented in this system.

In the example shown, the airship 200 comprises propulsion units 202, 204.

The airship is also equipped with capacitors C1 and C2, forming ballasts, and allowing modification of the stability and/or attitude of the airship 200 by filling or emptying the capacitors from a ballast circuit 205.

In the longitudinal direction, the bow of the airship 200 is said to be forward while the stern of the airship is said to be aft. The airship also has a tapered anchoring point 206, arranged at its bow. The airship can also be equipped with a winding drum 208 arranged at the bow that winds or unwinds a mooring cable 210, having a free end, from or to the docking station 300.

The airship has a center of gravity G.

According to the embodiment, the airship 200 also has two lateral anchoring points 212, 214 (not shown in the figure) arranged in a plane transverse to the longitudinal direction of the airship located behind the center of gravity G along the longitudinal direction, symmetrically and on either side of its yaw axis. Only the port side anchoring point 209 is shown in the figure.

The docking station 300 may, in a known manner, comprise a bow receiver device 400, also called a mooring mast, equipped with a base 402, possibly self-propelled, resting on the ground or the track S, and a pylon 404 at the top of which a winch is arranged comprising a winding drum 406 whose vertical axis is driven by a motor 408. The winding drum 406 is provided with a slot 410 arranged to receive a free end of the mooring cable 210.

When the airship 200 is approaching the bow receiver device 400, the pilot initiates a mooring procedure. The winding drum 208 of the airship is controlled in freewheel mode in order to release the unwinding cable toward the ground. The free end of the cable is then inserted into the receiving slot 410 of the winding drum 406. Once trapped in the receiving slot, the distance between the airship and the slot, therefore the ground S, is limited by the free cable length.

Conversely, during a take-off phase, the end of the mooring cable 210 is released, the winding drum 406 being controlled in freewheel mode while the winding drum 208 winds up the released mooring cable.

The mooring system according to the present disclosure can also be associated with a mechanical coupling system for coupling the airship to the bow receiver device, as described in application WO2018/099870 incorporated herein by reference.

In order to be able to stabilize the attitude of the airship, the docking station 300 further comprises a ground clearance control device 500, also called the aerostat tail receiving station. The ground clearance control device 500 has a frame 502 on which a weight 504 is fixed.

The device 500 further comprises two rigid arms 506, 508 (FIG. 2).

Each of the arms 506, 508, respectively, has the shape of an A, formed by two main beams 506$a$ and 506$b$, respectively, 508$a$ and 508$b$, forming the lateral branches of the A.

The two main beams 506$a$ and 506$b$, 508$a$ and 508$b$, respectively, are connected together at a vertex 506$s$, 508$s$, respectively, and connected together by a third beam 506$c$, 508$c$, respectively, forming the horizontal branch of the A.

Each of the arms 506, 508, respectively, has two proximal ends 506$p$1, 506$p$2, 508$p$1, 508$p$2, respectively, arranged at the bottom of the two lateral branches of the A and articulated on the frame (502), the distal end of the arm being arranged at the vertex 506$s$, 508$s$, respectively, of the A, thus defining an axis of rotation of the arm on the frame in the direction formed by the two proximal ends.

The device 500 further comprises a ground connection interface 510 (not shown). The ground connection interface 510 comprises wheels 512 mounted on the frame 502 whose orientation can be modified, for example, so-called idler wheels, or controlled, for example, mounted on a directional train.

In the example shown, the ground connection interface further comprises idler wheels 506r, 508r, respectively, mounted on the third beam 506c, 508c, respectively. Beam-mounted idler wheels are optional.

The device 500 further comprises a means of displacement (not shown) of the distal end or vertex 506s, 508s, respectively, of each of the arms 506, 508, respectively, toward the associated lateral anchoring points 212, 214 of the airship 200.

The displacement means may comprise two winches 216, 218 (not shown), each disposed in the airship 200 at a lateral anchor and a rope wound on each of the winches and passing through the lateral anchor.

According to another possibility, it is planned to use a drone as described in the aforementioned international application.

Thus, it is possible to control, from the airship 200, a means of bringing the distal end of an arm toward the associated lateral anchor of the airship and of fixing a free end of the mooring cable to the docking station or to the airship. The fixing can be done using a carabineer, or a Scharfenberg-type coupling system.

For the mooring phase, two cables can be released from the rear lateral anchors. A team on the ground fixes these cables at each end of the A-shaped frames of the undercarriage of the device according to the present disclosure.

The cables are then wound again on the winches 216, 218 to the mooring points by lifting both ends of the A-shaped frames until they reach the mooring points and are locked in position.

The pilot can then implement another step specific to the present disclosure comprising moving as much water as possible toward the aft ballast tanks, for example, from capacitor C1 to capacitor C2, which allows the airship to rest on the rear undercarriage object of the present disclosure. The trapping can then be considered complete and the airship can be left in the wind with the tail resting on the rear undercarriage.

As will be readily understood, the present disclosure is not limited to the examples that have just been described, and numerous modifications may be made to these examples without departing from the scope of the present disclosure. In addition, the various features, forms, variants, and embodiments of the present disclosure may be grouped together in various combinations as long as they are not incompatible or mutually exclusive.

The airship could have more than, for example, three anchoring points, with, for example, a bow point and three or four lateral anchoring points. Consequently, the docking station could have more than two arms, for example, three or four, or even have arms having a distal end attached to the airship at several points.

The invention claimed is:

1. A control device for controlling a ground clearance of an airship having two lateral anchoring points, the control device comprising:
a frame comprising a ground connection interface on which a weight is fixed;
two rigid arms, each of the arms having a proximal end articulated on the frame and a distal end;
moving means for moving the distal end of each arm between a retention position in which each distal end is in contact with one of the two lateral anchoring points of the airship, and an unlocked position in which there is no contact between the airship and the control device;
fixing means for detachably fixing, in the retention position, the distal end of each arm on an associated lateral anchoring point, respectively;
wherein the ground connection interface comprises wheels mounted on the frame, the wheels having a modifiable orientation,
wherein each of the arms has an A-shaped configuration formed b two main beams forming lateral branches of the A-shaped configuration, the two main beams being connected together at a vertex and connected together by a third beam forming a horizontal branch of the A-shaped configuration, two proximal ends of each arm being arranged at the bottom of the two main beams of the A-shaped configuration and articulated on the frame, the distal end of each arm being arranged at the vertex of the A-shaped configuration, an axis of rotation of each arm on the frame being defined in a direction of a line passing through the two proximal ends, and
wherein the third beam of each of the arms is equipped with additional wheels.

2. The control device of claim 1, wherein the wheels mounted on the frame are idler wheels.

3. The control device of claim 1, wherein the wheels have a controllable orientation.

4. The control device of claim 1, wherein the moving means comprise a winch placed in the airship at the associated lateral anchoring point and a rope wound on the winch and passing through the associated lateral anchoring point and the distal end.

5. A docking station for an airship equipped with a tapered anchoring point and two lateral anchoring points, comprising:
a mooring mast having a receiver arranged to receive, or be moored at, the tapered anchoring point of the airship; and
a control device according to claim 1, the distal end of each of the arms of the control device being arranged to be removably fixed to each of the two lateral anchoring points.

6. A method for securing the mooring of an airship equipped with a tapered anchoring point and two lateral anchoring points, on a site, implementing a docking station according to claim 5, the method comprising:
mooring a bow of the airship to the moong mast of the docking station with freedom of rotation of the airship about the mooring mast;
positioning the control device under a tail of the airship already moored via motorized displacement;
deploying both arms until reaching the two lateral anchoring points; and
fixing the distal ends of the two arms to the two lateral anchoring points, respectively.

7. The method of claim 6, further comprising, prior to the deploying of both arms, unwinding a cable from each lateral anchoring point, one free end of the cable being provided to be fixed to the distal end of each arm, and winding up the cable from each lateral anchoring point until the respective distal ends of the two arms mechanically engage in the respective lateral anchoring points.

8. The method of claim 7, further comprising tilting the airship so that the tail of the airship rests on the control device.

9. The method of claim 8, wherein the airship has a ballast system comprising a first ballast tank located at a front of the airship and a second ballast tank located at a rear of the airship, wherein the tilting comprises transferring water from the first ballast tank to the second ballast tank.

10. A control device for controlling a ground clearance of an airship having two lateral anchoring points, the control device comprising:
- a frame comprising a ground connection interface on which a weight is fixed;
- two rigid arms, each of the arms having a proximal end articulated on the frame and a distal end;
- moving means for moving the distal end of each arm between a retention position in which each distal end is in contact with one of the two lateral anchoring points of the airship, and an unlocked position in which there is no contact between the airship and the control device;
- fixing means for detachably fixing, in the retention position, the distal end of each arm on an associated lateral anchoring point, respectively;
- wherein the ground connection interface comprises wheels mounted on the frame, the wheels having a modifiable orientation, and
- wherein the moving means comprise a winch placed in the airship at the associated lateral anchoring point and a rope wound on the winch and passing through the associated lateral anchoring point and the distal end.

11. A method for securing the mooring of an airship equipped with a tapered anchoring point and two lateral anchoring points, the method comprising:
- mooring a bow of the airship to a docking station, the docking station comprising:
  - a mooring mast having a receiver arranged to receive, or be moored at, the tapered anchoring point of the airship; and
  - a control device for controlling a ground clearance of an airship having two lateral anchoring points, the control device comprising:
    - a frame comprising a ground connection interface on which a weight is fixed;
    - two rigid arms, each of the arms having a proximal end articulated on the frame and a distal end;
    - moving means for moving the distal end of each arm between a retention position in which each distal end is in contact with one of the two lateral anchoring points of the airship, and an unlocked position in which there is no contact between the airship and the control device;
    - fixing means for detachably fixing, in the retention position, the distal end of each arm on an associated lateral anchoring point, respectively;
    - wherein the ground connection interface comprises wheels mounted on the frame, the wheels having a modifiable orientation,
  - the distal end of each of the arms of the control device being arranged to be removably fixed to each of the two lateral anchoring points, the bow of the airship being moored to the mooring mast of the docking station with freedom of rotation of the airship about the mooring mast;
- positioning the control device under a tail of the airship already moored via motorized displacement;
- deploying both arms until reaching the two lateral anchoring points;
- fixing the distal ends of the two arms to the respective anchoring points;
- prior to the deploying of both arms, unwinding a cable from each lateral anchoring point, one free end of the cable being provided to be fixed to a distal end of each arm, and
- winding up the cable from each lateral anchoring point until the respective distal ends of the two arms mechanically engage in the respective lateral anchoring points.

* * * * *

UNITED STATES PATENT AND TRADEMARK OFFICE
CERTIFICATE OF CORRECTION

| | |
|---|---|
| PATENT NO. | : 12,060,168 B2 |
| APPLICATION NO. | : 17/759778 |
| DATED | : August 13, 2024 |
| INVENTOR(S) | : Yovan Orlic and Théo Dulou |

Page 1 of 1

It is certified that error appears in the above-identified patent and that said Letters Patent is hereby corrected as shown below:

In the Claims

| | | | |
|---|---|---|---|
| Claims Heading, | Column 5, | Line 62, | change "The invention claimed is:" to --what is claimed is:-- |
| Claim 1, | Column 6, | Line 16, | change "formed b two" to --formed by two-- |
| Claim 6, | Column 6, | Line 55, | change "to the moong mast" to --to the mooring mast-- |

Signed and Sealed this
Seventeenth Day of September, 2024

*Katherine Kelly Vidal*

Katherine Kelly Vidal
*Director of the United States Patent and Trademark Office*